United States Patent [19]
Dorr et al.

[11] 3,780,499
[45] Dec. 25, 1973

[54] SYSTEM FOR THE LIQUID-PHASE REMOVAL OF A COMPONENT FROM THE GAS STREAM ESPECIALLY THE ABSORPTION OF SULFUR TRIOXIDE IN SULFURIC ACID

[75] Inventors: Karl-Heinz Dorr, Mainz; Hugo Grimm, Frankfurt am Main; Rolf Kola, Homberg, all of Germany

[73] Assignee: Metallgesellschaft Aktiengesellschaft, Frankfurt am Main, Germany

[22] Filed: Oct. 12, 1971

[21] Appl. No.: 188,127

[30] Foreign Application Priority Data
Oct. 15, 1970 Germany .................... P 20 50 580.0

[52] U.S. Cl. ............................... 55/32, 55/94, 55/73
[51] Int. Cl. ........................................... B01d 53/14
[58] Field of Search ..................... 55/29–32, 73, 93, 94, 233, 257

[56] References Cited
UNITED STATES PATENTS

| | | | |
|---|---|---|---|
| 3,593,497 | 7/1971 | Grimm et al. | 55/250 |
| 2,935,375 | 5/1960 | Bouchet | 55/257 |
| 3,577,706 | 5/1971 | Moller | 55/30 |

*Primary Examiner*—Charles N. Hart
*Attorney*—Karl F. Ross

[57] ABSTRACT

A process for the removal of gaseous components from a gas stream by liquid-phase absorption of the component in the treatment of the gas with a liquid, especially the absorption of sulfur trioxide from a gas stream obtained by the contact-catalysis oxidation of sulfur dioxide in the production of sulfuric acid, makes use of a uniflow vertical venturi absorber followed by a turbulencing device or horizontal venturi absorber and a counterflow column absorber or tower. The absorbing liquid is sulfuric acid.

11 Claims, 2 Drawing Figures

SYSTEM FOR THE LIQUID-PHASE REMOVAL OF A COMPONENT FROM THE GAS STREAM ESPECIALLY THE ABSORPTION OF SULFUR TRIOXIDE IN SULFURIC ACID

FIELD OF THE INVENTION

Our present invention relates to a process for absorbing gaseous components from a fluid such as a gas stream containing these components with the aid of absorbing liquids, i.e., a process for the treatment of a gaseous phase with a liquid phase so as to dissolve a component of the gaseous phase in the liquid phase. More particularly, the invention relates to the absorption of sulfur trioxide or moisture from the gases containing same, e.g. the gaseous effluent of a contact-catalysis stage converting sulfur dioxide to sulfur trioxide, using sulfuric acid as the absorbing phase. The present invention also relates to subject matter described in our commonly owned copending application Ser. No. 188,128, filed Oct. 12, 1971 entitled ABSORBER FOR SULFUR TRIOXIDE.

BACKGROUND OF THE INVENTION

In the art of treating gases with liquids to absorb or solubilize a component of the gas stream in the liquid phase, numerous techniques have been employed to gain efficient gas/liquid interaction with low energy losses, high throughput, effective heat and material exchange, and economy of operation. Typical of the prior-art systems for these general purposes are trickle towers in which a cascade of droplets of the liquid phase is passed countercurrent to a rising gas stream through free space. Washing towers may inject the liquid phase at a higher pressure and may be provided with baffles or packing, the gas for the most part rising countercurrent to the liquid phase. Both of these systems generally require very tall towers for efficient operation with high-energy expenditure to raise the liquid phase to the top of the tower and limitations on the gas-flow velocity if movement of the liquid phase through the column is not to be impeded. Systems have also been devised wherein the gas phase is permitted to bubble through the liquid phase, e.g. in the bubble-cap trays of multistage gas/liquid contactors. In still other systems, a uniflow relationship between the gas and liquid is established, i.e. the gas and liquid move codirectionally. In all of these systems, it is desired to optimize the intimate contact of the gas with the liquid to achieve efficient thermal and material exchange in the shortest possible time and yet with a minimum of energy loss in maximum throughput and a low-pressure drop. Seldom have the systems described earlier proved to be effective on all of these counts and, especially where the absorbing liquid is a substance such as sulfuric acid, i.e., in the absorption of sulfur trioxide from the gases in a sulfuric acid plant or the removal of moisture from a gas to be subjected to further processing, the conventional systems of obtaining gas/liquid contact have been found to be problematic.

In the production of sulfuric acid, sulfur dioxide ($SO_2$) can be converted to sulfur trioxide ($SO_3$) by contact catalysis in a number of stages. After such contact-catalysis or sulfur-trioxide-production stages, it has been proposed to provide absorbers for sulfur trioxide to recover the latter. As a result of such absorption, the conversion of sulfur dioxide to sulfur trioxide in a succeeding stage is improved and a high yield of sulfuric acid is obtained. The absorption of sulfur trioxide from the gases emerging from a contact catalysis step should be carried out with maximum economy in a simple and convenient manner.

For example, the economic operation of an interstage absorber requires that the loss of heat in this operation be held to a minimum, that the temperature of the acid in an interstage absorber be relatively high so that less heat is transferred from the gas phase to the liquid phase, and that the gas velocity be high and the pressure drop low. The use of hot acid and the requirement for a small pressure drop complicates the design of an absorber because the latter must be resistant to acid attack at high temperatures and dimensioned to minimize the aforementioned pressure drop.

In prior-art systems, absorption generally uses a columnar device. This has the inherent disadvantages described earlier. Among the conventional absorbers in accordance with conventional practices, are absorption towers with packing or baffles and which must be of considerable height. These systems require high capital expenditure, are voluminous and are inefficient. Furthermore, the acid must be pumped to considerable heights before being allowed to trickle downwardly and the upward gas-flow rate must be controlled so as to avoid obstructing the downwardly trickling liquid phase.

Conventional foam absorbers must have a large number of stages in cascade if sufficient absorption is to be obtained. Here also, the height of the unit is considerable and often prohibitive.

It has also been proposed heretofore to provide so-called venturi absorbers, generally comprising a plurality of venturi chambers in series, the liquid phase and the gas phase being separated downstream from each venturi. A venturi absorber is simply a venturi-type restriction through which the flow of one fluid induces the flow of the other, the fluids being intimately contacted with one another. As a result, the liquid phase absorbs sulfur trioxide from the gas phase and is separated from the latter in the enlarged cross-section chamber downstream from the venturi. A venturi cascade, however, is not satisfactory for interstage or final absorption because of the equipment cost and high heat loss which is characteristic of a series connection of venturi absorbers.

From time to time earlier we have referred to interstage absorption and final absorption and we wish to make clear that the present invention is concerned with both types of absorption in the sense that the processes according to the present invention and the apparatus for practicing them can be used for any stage in the process for producing sulfuric acid when it is desired to recover sulfuric trioxide from the gas mixture. It is equally applicable to the treatment of gases with sulfuric acid during drying processes and wherever sulfuric acid is used to absorb a substance from the gas stream.

OBJECTS OF THE INVENTION

It is the principal object of the present invention to provide an improved process for the absorption of a component from a gas stream in a liquid phase wherein the disadvantages of earlier systems can be avoided.

Another object of the invention is to provide a method for contacting a gas phase with a liquid phase wherein the intimacy of contact is improved, the transfer efficiency is high, the pressure drop or loss is low, the throughput is high and the capital and operating costs are low.

Still another object of the invention is to provide a method for absorbing a component such as sulfur trioxide or water vapor from a gas stream with an absorbent such as sulfurc acid which can be carried out with a low acid-consumption rate and with high throughput in an apparatus of small volume occupying a small area of the plant.

SUMMARY OF THE INVENTION

These objects and others which will become apparent hereinafter, are attained in accordance with the present invention, in a system for the treatment of a gas phase with a liquid phase, especially the absorption by sulfurc acid or sulfuric trioxide from the effluent of a constant-catalysis sulfuric-acid plant in which sulfur dioxide is oxidized to sulfur trioxide, wherein the gas phase and the liquid phase are passed in uniflow, i.e., in the same direction, through a suitable absorber in a first absorption stage to effect the major absorption of the gaseous component of interest into the liquid phase. This initial or first-stage absorption is followed by second-stage absorption carried out in a column with the gaseous fluid and the liquid phase being passed countercurrent to one another. Between the two stages, we provide at least one settling stage in which droplets of the first-stage absorbent are collected.

We have found it to be advantageous to carry out this process under conditions such that 90 – 98 percent by weight of the gaseous components which are to be absorbed in the liquid phase, are removed during the first absorption stage, i.e. prior to the passage of the gaseous phase through the countercurrent absorption column or tower.

As already indicated, an important characteristic of the present invention is that the first stage of the absorption process, at which preferably 90 – 98 percent of the absorbable components are removed, is carried out in a venturi absorber which is oriented vertically but directed downwardly and in any event against a liquid-intercepting surface such as the sump. However, the venturi absorber may also be oriented horizontally in which case we prefer to provide an impingement-type liquid precipitator ahead of the outlet of the venturi absorber.

Preferably, the first absorption stage consists of two steps, the first being carried out in an upright venturi absorber supplied with the absorption liquid, the second step being a turbulencing or reagitation which is carried out in a reagitator or turbulencing stage between the venturi absorber and the second-stage column. Additional absorbing liquid may be introduced at the second-stage venturi which, as noted, is horizontally oriented and constitutes a turbulence-creating or reagitating means. It is not, however, essential that an additional quantity of liquid be introduced at the reagitator.

According to yet another feature of the invention, the absorption column of the second stage and the outlet of the reagitator have a common liquid-collecting sump. In the treatment of gases containing sulfur trioxide, it has been found to be advantageous to introduce the absorbent at the reagitator if the effluent from the contact-catalysis stage has a high sulfur-trioxide content, if oleum is produced in the first absorber stage (venturi absorber) and if interstage absorption leaves large quantities of sulfur trioxide in the gases entering a subsequent stage. The absorbing liquid may be injected separately in a connecting passage between the two stages or may be fed to the gas stream which is directed through a constriction or aperture plate. Systems of the latter type, as contrasted with a venturi passage, provide a high degree of turbulence or reagitation with increased pressure drop and hence are less efficient than a venturi absorber.

According to still another feature of the invention, the absorbing liquid is injected into the first or vertical venturi absorber of the first stage at a pressure of 8 – 20 m of head of the absorbing liquid. For reasons which are not fully understood, this pressure range provides a particularly high absorption rate. The second absorption stage may be carried out in an empty or packed tower and the latter is preferred. Thus the second absorption stage may be constituted by a vertical tower having at least one packing layer and communicating at its bottom with a sump which also serves as a settling chamber for the reagitator. The gaseous fluid passes upwardly through the tower while the liquid phase is spread onto the packing from above and percolates through the packing which preferably has a height of 0.8 – 2.5 m. The packing may be saddle-shaped ceramic bodies or equivalent packings with similar surface area. Advantageously, a mist collector or droplet trap is provided at the outlet side of the second absorption stage. The mist collector may include one or more levels or stages and preferably comprises wire-mesh filters. If a multistage mist collector is provided, the first may be a packing filter in which a layer of porous packing is provided on a perforated plate while the subsequent filter layers are wire-mesh bodies. One or more perforated plates may also be used for condensation of droplets.

When the system is employed for the removal of sulfur trioxide from the effluent of a contact catalysis plant for the production of sulfuric acid, the sulfuric acid used as the absorbent is of a concentration and temperature adjusted to provide a sulfuric acid temperature at the end of the first venturi absorber (first stage) of 100° to 180°C. The heat taken up by the acid can be transferred via heat exchangers for further use, e.g., for the preheating of feed water. This condition also ensures a high transfer efficiency of the sulfur trioxide. The sulfuric acid supplied to the absorption stage has a concentration of 94 to 98 percent by weight while the sulfuric acid concentration as introduced into the column of the second absorption stage is 98.5 to 99.1 percent by weight. The absorbent is trickled through the second absorption stage at a rate of 3 to 10 $m^3$ per hour per $m^2$ of the free cross-sectional area of the second absorption stage. The gas velocity through the latter is 1.8 to 3.5 m per second per $m^2$ of the flow cross-section of the second stage.

The apparatus of the present invention may also be used as a dryer and we may derive a weak sulfuric acid having a concentration of, for example, 76 to 80 percent by weight from the first absorption stage of the dryer. The absorbing liquid supplied to the first and second absorption stage of a dryer and to the first absorption stage of the $SO_3$ absorber is circulated by a common system, thereby reducing the circulating arrangements to a single pump for all three stages.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
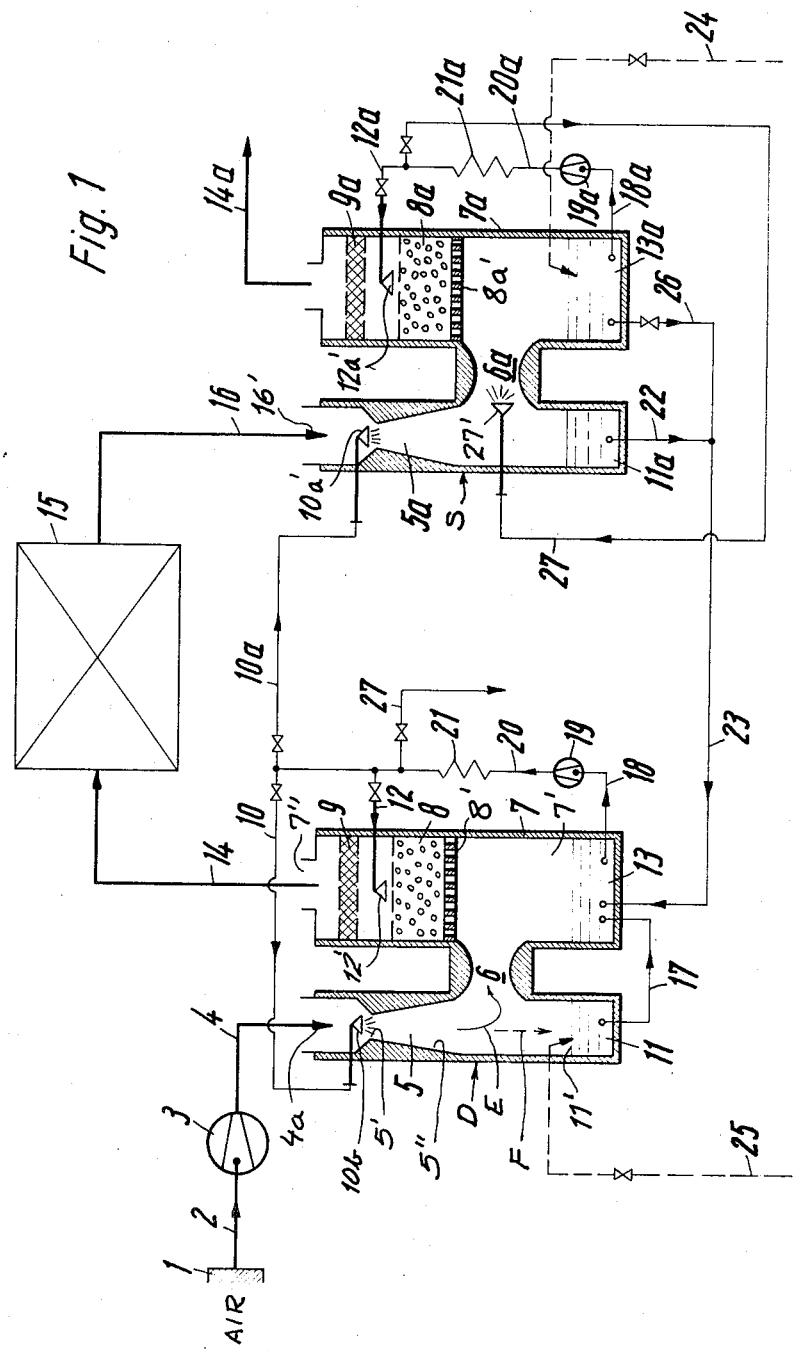
FIG. 1 is a flow diagram of a portion of a sulfuric acid plant embodying the present invention.

In FIG. 1 of the drawing, we have shown diagrammatically a plant for the removal of sulfur trioxide from a gas stream and for the preparation of the oxygen or air supply of a contact-catalysis stage in a sulfuric acid production line. In this apparatus, the air source comprises a filter 1, connected by a duct 2 to a compressor 3 whose outlet is provided with a conduit 4 opening at a nozzle 4a into a dryer D. The nozzle 4a is coaxially aligned with an annular spray head 10b of a sulfuric acid conduit delivering sulfuric acid to the first venturi absorber 5 in the dryer D. The vertical venturi absorber 5 has a constriction 5' at the nozzle 10b and ahead of the nozzle 4a, and a divergent outlet 5'' opening downwardly on the surface 11' of a body of sulfuric acid contained in the sump beneath the vertical venturi. In accordance with conventional venturi absorber principles, the gas and sulfuric acid (liquid phase) pass at high velocity and in intimate admixture through the constriction 5' in which moisture is transferred from the gas phase to the sulfuric acid which collects in somewhat diluted form in the sump 11. As the high-velocity mixture expands beneath the constriction, large-diameter liquid particles settle into the sump. Since the outlet from this stage of the dryer is laterally of the flow direction of the mixture, high-velocity small particles and particles with high momentum cannot divert in the direction of arrow E and continue to impinge upon the body of liquid in the sump (arrow F).

The gas, entraining residual liquid, then traverses a horizontal venturi constriction 6 forming the second venturi absorber or agitator, in which further turbulent mixing of the gas phase with the residual liquid phase occurs. As the gas passes into the vertical tower 7, it meets a settling chamber 7', so that some of the liquid phase collects in a sump 13 therebelow. Above the second venturi 6, the vertical column 7 is formed with a perforated plate 8' surmounted by a packing layer 8 of acid-resistant packing bodies as described earlier. A spray head 12' is provided to supply the descending liquid phase which is contacted with the rising gaseous phase. A mist collector 9 of wire mesh is provided above the packing 8 and below an outlet 7'' which communicates via a conduit 14 with a contact catalyst stage 15 in which the dried oxygen is used to oxidize $SO_2$ to sulfur trioxide.

In the sulfur-trioxide absorption apparatus S, the vertical venturi absorber 5a is provided with a sulfuric-acid nozzle 10a' and a nozzle 16' through which the mixture of sulfur-dioxide and sulfur-trioxide gases enter the column. A sump 11a below the venturi absorber 5a collects droplets of sulfuric acid while the gas passes through the venturi constriction 6a which can be provided with baffles, vanes and the like as described in the copending application mentioned earlier. A nozzle 27', however, centrally introduces sulfuric acid into a second or horizontal venturi absorber 6a.

In the second state of the absorber S, there is a vertical tower 7a which is formed with a sump 13a for collecting the sulfuric acid entering through the horizontal venturi absorber and percolating through the packing 8a above the perforated plate 8a' of the tower 7a above venturi absorber 6a. The nozzle or spray head 12a' supplies the percolating sulfuric acid while the mist collector 9a traps acid droplets from the gases passing through the outlet and via a pipe 14a to, for example, a further contact catalyst stage.

The apparatus illustrated in FIG. 1 comprises, in addition to the structure described, a line 17 connecting sump 11 with sump 13 and a circulating pump 19 which delivers this sulfuric acid in part via line 10 to the first absorber 5 and, in part, via line 10a to the absorber 5a of the second phase of the process. Line 12 and an appropriate valve taps off an additional portion of the sulfuric acid for percolation through the packing 8. Lines 22, 23 and 26 conduct additional portions of the sump liquid at 11a and 13a to the sump 13 while a circulating pump 19a provides the percolating liquid for line 12a and nozzle 12a'.

Figure 2:
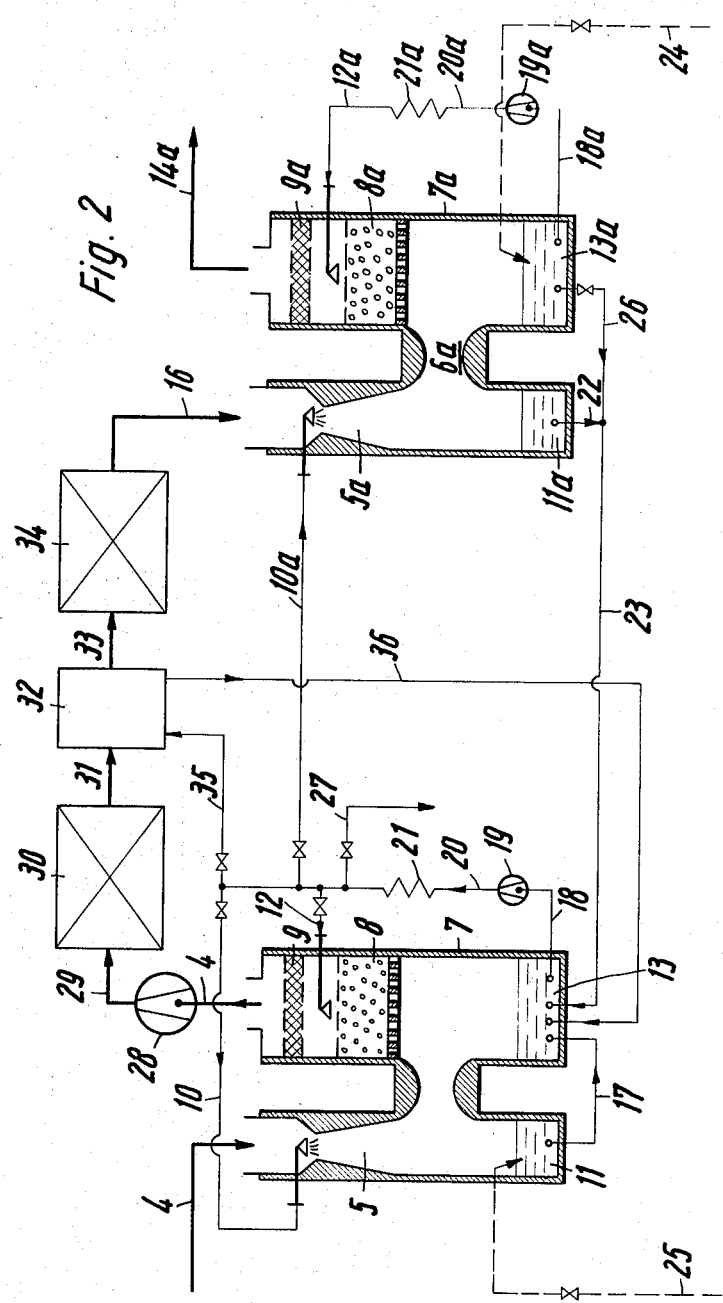
FIG. 2 is a flow diagram illustrating another plant.

In FIG. 2, in which similar reference numerals represent identical functional elements, the gas outflow from the dryer is compressed at 28 and is supplied via conduit 29 to the first stage 30 of a contact-catalysis plant for the production of sulfuric acid. The sulfur-dioxide/sulfur-trioxide mixture is then passed into an interstage absorber 32 which can have the construction of the absorbers already described, but preferably is of the type illustrated in the above-mentioned copending application, the sulfuric-acid lines 35 and 36 being connected to the interstage absorber. The sulfur-dioxide/sulfur-trioxide mixture then passes through line 33 to the next contact-catalysis stage with the effluent therefrom feeding the final absorber via line 16.

SPECIFIC EXAMPLES

Example I

The system of FIG. 1 is used to dehumidify the feed air for the contact-catalysis oxidation of sulfur dioxide to sulfur trioxide and for the absorption of sulfur trioxide from the effluent gases of a sulfuric acid plant producing 100 metric tons of sulfur trioxide monohydrate, the sulfur dioxide being produced in accordance with conventional techniques by the combustion of sulfur.

The air having a temperature of 20°C and a relative humidity of 80 percent is drawn at a rate of 12,360 $m^3/h$ (STP) through the filter 1 and is forced via conduit 4 into the first-stage venturi absorber 5 of the dryer, the moisture being removed by contact of this gas phase with sulfuric acid. The second absorbing stage of the dryer contains the packing layer 8 to the height of 1.5 meters and composed of saddle-shaped packing bodies of the type described earlier. Sulfuric acid at a concentration of 19.6 percent by weight is injected into the venturi absorber 5 at a rate of 15 $m^3/h$ and at a pressure of 16 meters of head of this liquid.

The major part of the sulfuric acid introduced into the absorber 5 is recovered from the sump 11 at a temperature of 60°C while the air, with reduced moisture content and residual sulfuric acid passes through the venturi absorber 6 into the tower 7. Approximately 97 percent of the water vapor contained in the air introduced into the venturi absorber 5 is removed prior to passage of the air into the absorption tower 7. In the tower, sulfuric acid at a concentration of 97.6 percent by weight is sprayed onto the column 8 at a rate of 7 m³/h and trickles downwardly countercurrent to the rising air, the trickling rate being about 6 m³/h for each m² of free cross-sectional area of the column 7. The sulfuric acid is collected in the sump 13 of the tower at a temperature of 51°C. The air passing through the mist collector 9 and leaving the dryer has a temperature of 50°C and a water vapor content of 40 mg/m³ (STP).

The dry air is delivered to the sulfur-burning plant and is used to produce a gas containing 7.5 percent $SO_2$ by volume for contact catalysis in plant 15. In the latter, 98 percent of the $SO_2$ is converted to $SO_3$ and the effluent gas at a temperature of 200°C at a rate of 12,168 m³/h (STP) is delivered to the absorption stage S. The venturi absorber 5a is supplied with sulfuric acid at a concentration of 97.6 percent by weight at 32 m³/h under a pressure of 16 meters of sulfuric acid head. The major portion of the sulfuric acid is collected at a temperature of 130°C in the sump 11a and has a concentration of 99 percent by weight. Approximately 95 percent of the sulfur trioxide is recovered at the venturi absorber 5a. The gases, entraining residual sulfuric acid, pass through the horizontal venturi absorber 6a into which sulfuric acid at a concentration of 98.9 percent by weight and a temperature of 70°C is injected through conduit 27 at a rate of 32 m³/h at a pressure of 16 meters of sulfuric acid head. The sulfur trioxide removed in the venturi absorber 6a is about 4.7 percent of the initial $SO_3$. The sulfuric acid, heated to 80°C is recovered in the sump 13a.

As the gases rise through the packing 8a having a height of 1.5 m, they are exposed to sulfuric acid of a concentration of 98.9 percent by weight and a temperature of 70°C distributed over the packing at a rate of 11 m³/h. The trickling rate is 10 m³/h for each m² of the free cross section of the tower 7a. The sulfuric acid, at a temperature of 75°C, is collected in the sump 13a. The gas leaving the absorber via conduit 14a, has a temperature of 70°C and a sulfur trioxide content of 70 mg/m³.

The acid from sump 11 passes through duct 17 into sump 13 which feeds a pump 19 via conduit 18. The sulfuric acid is then passed via duct 20 into the acid cooler 21, having the configuration of an air-cooled radiator in which the sulfuric acid temperature is reduced to 50°C.

The acid from sump 11a flows via lines 22 and 23 into the sump 13. The acid from sump 13a is fed via a pump 19a to the cooler 21a via line 20a, the cooler reducing the temperature to about 70°C. Diluting water for adjusting the acid product to the desired concentration is supplied via ducts 24 and 25 to the sumps 13a and 11. Sulfuric acid is withdrawn from the sump 13a via conduit 6 at a rate controlled by a valve, which corresponds to the rate at which product sulfuric acid is collected in sump 13a. At that rate, sulfuric acid is supplied via conduit 23 to the sump 13. The product sulfuric acid, having a concentration of 97.6 by weight and a temperature of 50°C is withdrawn through conduit 27.

Example II (FIG. 2)

The following Example relates to a plant producing 100 metric tons of $SO_3$ monohydrate per day.

Gas from roasting having an $SO_2$ content of 8.5 percent by volume, a temperature of 40°C and a relative humidity of 100 percent flow in conduit 4 at a rate of 11,050 cubic meters per hour (STP). Sulfuric acid having a concentration of 97.1 percent by weight flows in conduit 10 at a rate of 33 cubic meters per hour. The sump 11 contains acid at a temperature of 75°C. 97 percent of the water content of the gas are absorbed in the predrying stage. Sulfuric acid at a rate of 10 cubic meters per hour flows in conduit 12. Sulfuric acid at 67°C leaves the packing layer 8.

Dried gas which contains 70 milligrams water per cubic meter (STP) is drawn from the dryer through conduit 14 by the blower 28 and is forced through conduit 29 into the first stage 30 of a contact process plant where 85 percent of the $SO_2$ content is reacted to form $SO_3$. The resulting gas is supplied through conduit 31 into the interstage absorber 32 where a considerable part of the $SO_3$ content is removed by interstage absorption in sulfuric acid. The gas is then supplied through conduit 33 to the second stage 34 of the contact process plant in which a final conversion of $SO_2$ to $SO_3$ is effected so that 99.5 percent of the initial $SO_2$ content is converted. Sulfuric acid having a concentration of 97.1 percent by weight and a temperature of 50°C. is supplied through conduit 35 at a rate of 20.5 cubic meters per hour to the interstage absorber 32. At a temperature of 150°C. the sulfuric acid is recycled from the interstage absorber 32 through conduit 36 back to the sump 13 of the dryer.

Gas at a temperature of 180°C. flows through conduit 16 at a rate of 9,830 cubic meters per hour (STP). Sulfuric acid at a rate of 15 cubic meters per hour flows in conduit 10a. The acid in the sump 11a has a temperature of 100°C. Acid is not injected into the Venturi absorber 6a. 97 percent of the $SO_3$ content is absorbed in the preabsorber. Sulfuric acid having a concentration of 99 percent by weight and a temperature of 70°C. flows in conduit 12a at a rate of 12.5 cubic meters per hour. The acid leaving the packing layer 8a is at a temperature of 70° C. Sulfuric acid having a concentration of 97.1 percent by weight and a temperature of 50° C. flows in conduit 27.

The process according to the invention has the following advantages:

The combined uniflow and countercurrent absorption process enables an absorption of the largest amount and the dissipation of the resulting heat in the uniflow stage requiring absorbing liquid at a low rate and with a low pump capacity. The resulting heat can be utilized. Owing to the low rate of absorbing liquid, the first absorption stage may be small or operated with a low pressure loss. The second absorption stage operated in a countercurrent then enables a fine absorption requiring absorbing liquid at a low rate because the concentration can be maintained in an optimum range throughout the stage. This combination enables an operation involving a low pressure loss and with a high throughput. For instance, the gas velocity can be increased to 1.8–3.5 meters per second whereas it is only 0.5–1.2 meters per second in a strict countercurrent absorption process.

We claim:
1. A process for contacting a liquid phase consisting of sulfuric acid with a gas phase containing moisture and /or sulfur trioxide to absorb the moisture and/or sulfur trioxide component of the latter in said liquid phase, comprising the steps of:
   a. passing at least a portion of said liquid phase and said gas phase in uniflow through an absorber to intimately contact said phases with one another by first passing said portion of said liquid phase and said gas phases jointly through a vertical venturi absorber, collecting liquid from the phases traversing said venturi absorber in a sump therebelow, and deflecting the remainder of the gas phase and passing it through a horizontal venturi absorber;

b. thereafter passing at least another portion of said liquid phase in a vertical column in counterflow to the gas phase traversing said horizontal venturi absorber for further interaction of said phases, said horizontal venturi absorber connecting the counterflow and uniflow steps; and c. separating said liquid phase from said gas phase.

2. The process defined in claim 1 wherein said liquid and gas phases are passed through said absorbers at a rate and under conditions such that 90 to 98 percent of said component is removed from said gas phase in step (a).

3. The process defined in claim 1 further comprising the step of injecting a further portion of said liquid phase into said horizontal venturi absorber.

4. The process defined in claim 3 wherein said liquid phase is injected into at least one of said venturi absorbers at a pressure between 8 and 20 meters of head of the liuqid phase.

5. The process defined in claim 1 wherein said column contains a packing layer, the liquid phase in step (c) being applied to said packing layer from the top and trickling downwardly therethrough and said gas phase in step (b) passing upwardly through said packing layer.

6. The process defined in claim 5 wherein said packing layer has a height between 0.8 and 2.5 meters.

7. The process defined in claim 5 wherein said gas phase contains sulfur trioxide, the concentration of said acid and rate of supply thereof in step (a) being dimensioned to maintain the temperature of said gas phase upon discharge from said venturi absorber of step (a) at 100° to 180°.

8. The process defined in claim 7 wherein the sulfuric acid supplied in step (a) has a concentration of 94 to 98 percent by weight.

9. The process defined in claim 8 wherein the concentration of sulfuric acid supplied in step (b) is 98.5 to 98.1 percent by weight.

10. The process defined in claim 9 wherein the sulfuric acid in step (b) is trickled through said layer at a rate of 3 to 10 m³/h/m² of the free cross-sectional area of said column.

11. The process defined in claim 10 wherein said gas phase is passed upwardly through said layer at a rate of 1.8 to 3.5 m/sec.

* * * * *